United States Patent Office 3,512,938
Patented May 19, 1970

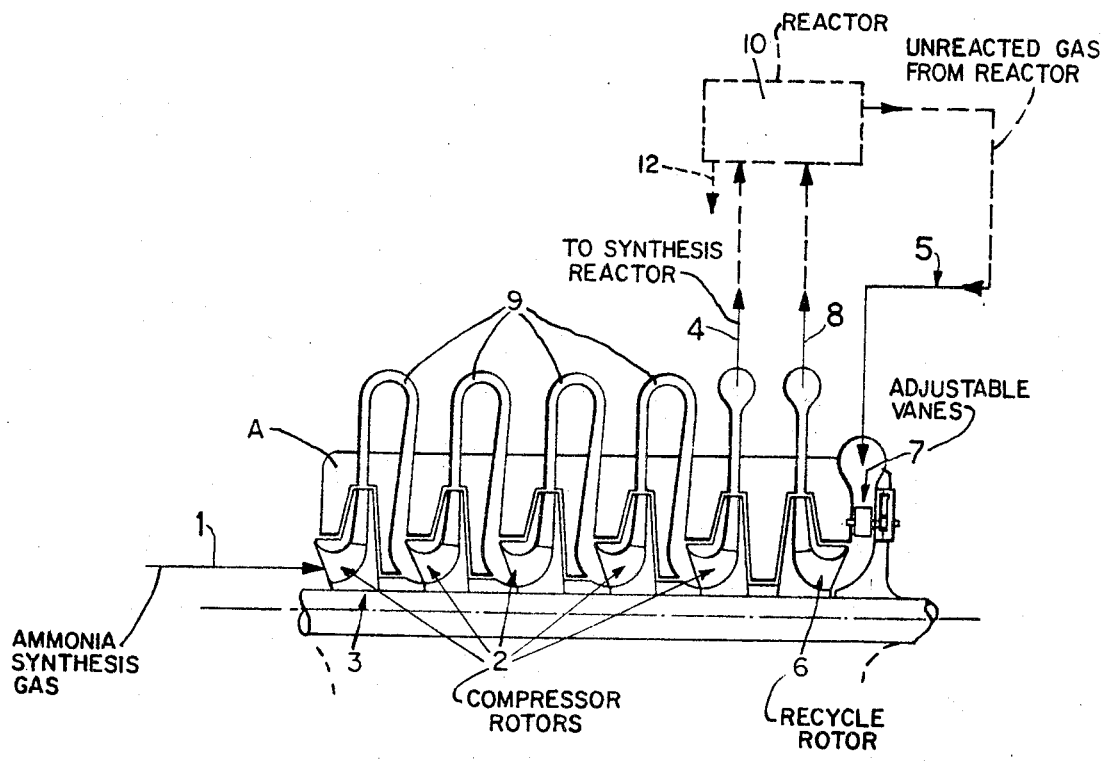

3,512,938
SYSTEM FOR ADJUSTING THE RECYCLE
RATE OF FLOW IN AMMONIA SYNTHE-
SIZING PROCESSES
Francesco Fraschetti, Firenze, Italy, assignor to Nuovo
Pignone S.p.A., Firenze, Italy, a Italian company
Filed July 7, 1966, Ser. No. 563,446
Claims priority, application Italy, July 14, 1965,
6,876
Int. Cl. C01b 2/02; C01c 1/04
U.S. Cl. 23—252                                1 Claim

ABSTRACT OF THE DISCLOSURE

In this system for synthesizing ammonia, the gas mixture is fed to a compressor having a plurality of rotors all mounted on the compressor shaft, and it is circulated from one rotor to another successively. The gas compressed to synthesis pressure is sent to the synthesis reactor by the last rotor; and the unreacted gas is pumped to a recycling rotor keyed to the same shaft as the other rotors and is recycled from this recycling rotor to the reactor. A series of adjustable vanes in the inlet duct, which connects the reactor with the recycling rotor, adjusts the rate of flow of gas to the recycling rotor and thus the rate of flow of gas, that is recycled, to the reactor.

---

This invention relates to a system for adjusting the rate of flow of gases which are recycled in ammonia synthesizing processes.

In said processes, the excess unreacted gas of the synthesis reactor is drawn by a compressor or an ejector and recycled within said reactor. In recent years the use of a centrifugal compressor has become conventional for compressing the synthesis gases.

Compression is effected by a plurality of serially arranged compressors, on the last of which a rotor is keyed, intended to recycle the excess gas of the reactor.

The rate of flow of the recycled gas, necessary for the synthesis, is small when the process is started, and is gradually increased due to catalyst deterioration.

The recycle rotor should thus be proportioned for the maximum required rate of flow, the consequence being a waste of power at the start of the process.

An object of the present invention is to provide a system permitting adjusting the rate of flow of the gas to be recycled consistently with the requirements, so as to do away with said drawback.

The invention is illustrated in the accompanying drawing which is a merely exemplary, non-limiting embodiment, in that the adoption of constructional techniques or equivalent component parts other than those suggested herein lies within the scope of the present invention;

The fresh gas mixture 1 is compressed to synthesis pressure by a set of rotors 2, which are interconnected by conduits 9 and are all keyed to the same drive shaft 3 of the compressor. The compressed gas is sent through conduit 4 to the synthesis reactor 10.

The unreacted portion of gas is drawn off and sent by conduit 5 to the recycling rotor 6 within the compressor A and keyed to shaft 3 thereof. The gas is recycled from rotor 6 into reactor 10 through conduit 8. The liquid ammonia may be drawn off from the reactor at any convenient point, as through the line 12.

At the mouth of said rotor 6, to the fixed part of the compressor A there are hinged on the inside of the inlet conduit, that lets gas into the rotor 6, a series of damper vanes 7 which can thus be preset at leisure, both manually and automatically. According to the orientation of the vanes 7, the flow of the gas that is recycled into the reactor 10 is varied. Thus, the rate of flow of gas from the reactor to the rotor 6, and the flow of gas that is recycled from rotor 6 to the reactor 10 are controlled.

I claim:
1. In a system for synthesizing ammonia,
a compressor having a shaft and a plurality of compressor rotors secured in line along said shaft,
conduit means for conducting the gas, which is to be compressed, from one rotor to another successively to compress the gas to synthesis pressure,
a reactor,
a conduit conducting the gas from the last rotor in said line to said reactor,
a further recycling rotor secured to said shaft,
an inlet conduit for conducting unreacted gas from the reactor to the mouth of said recycling rotor,
an outlet conduit for conducting gas from said recycling rotor back to said reactor, and a damper vane adjustably mounted in the mouth of said recycling rotor for adjusting the rate of flow of the gas in said inlet conduit.

References Cited

UNITED STATES PATENTS

| | | |
|---|---|---|
| 2,339,150 | 1/1944 | Codrington. |
| 2,371,706 | 3/1945 | Planiol. |
| 2,614,747 | 10/1952 | Christensen. |
| 2,972,441 | 2/1961 | Hall. |
| 3,251,539 | 5/1966 | Wolfe et al. |
| 3,289,919 | 12/1966 | Wood. |
| 3,349,569 | 10/1967 | Nebgen _____ 62—26 XR |
| 3,350,170 | 10/1967 | Finneran _____ 23—199 |
| 3,368,869 | 2/1968 | Gaumer _____ 23—199 |
| 3,140,074 | 7/1964 | Baldur. |

FOREIGN PATENTS 556,025    11/1924    France.

NORMAN YUDKOFF, Primary Examiner

A. F. PURCELL, Assistant Examiner

U.S. Cl. X.R.

23—199